United States Patent
Couet (10) Patent No.: US 7,953,366 B2
(45) Date of Patent: May 31, 2011

(54) SIGNAL TRANSMISSION ON A COAXIAL CABLE

(75) Inventor: Jean-Yves Couet, Saint Martin le Vinoux (FR)

(73) Assignee: STMicroelectronics, SA, Montrouge (FR)

( * ) Notice: Subject to any disclaimer, the term of this patent is extended or adjusted under 35 U.S.C. 154(b) by 1938 days.

(21) Appl. No.: 10/354,359

(22) Filed: Jan. 29, 2003

(65) Prior Publication Data

US 2003/0141949 A1 Jul. 31, 2003

(30) Foreign Application Priority Data

Jan. 29, 2002 (FR) ..................... 02 01038

(51) Int. Cl.
| | |
|---|---|
| H04B 7/14 | (2006.01) |
| H04B 7/185 | (2006.01) |
| H04B 1/06 | (2006.01) |
| H04B 7/00 | (2006.01) |
| H04B 7/212 | (2006.01) |
| H04H 20/71 | (2008.01) |
| H04H 60/09 | (2008.01) |
| H01Q 19/12 | (2006.01) |
| H04N 5/44 | (2011.01) |
| H04N 5/50 | (2006.01) |
| H04N 7/20 | (2006.01) |
| H04N 7/18 | (2006.01) |
| H04N 7/16 | (2011.01) |
| H03K 5/159 | (2006.01) |
| H04L 5/12 | (2006.01) |
| H04L 23/02 | (2006.01) |
| H04L 27/08 | (2006.01) |

(52) U.S. Cl. ........ 455/20; 455/3.04; 455/12.1; 455/266; 343/840; 348/725; 348/735; 370/343; 375/229; 375/262; 375/345; 725/68; 725/78; 725/143

(58) Field of Classification Search .................... 455/20, 455/131, 133, 142, 150.1, 62, 154.1, 176.1, 455/180.1, 188.1, 266, 269, 272, 275, 423, 455/67.11, 67.12, 67.14, 115.1, 115.2, 226.1, 455/3.02, 234.1, 252.1, 277.1, 323, 562.1, 455/304, 12.1, 76, 188.2, 191.2, 209, 293, 333, 339, 340, 114, 118, 192.2, 200.1, 258, 261, 427, 428, 431, 452.2, 501, 561; 379/1.03, 387.02, 93.08, 100.17, 348, 399.02, 1.04, 2, 9.04, 9.06, 12, 16, 17, 22.05, 22.06; 342/13, 29, 20, 354, 359; 343/781 R, 840, 237, 772, 773, 786, 850, 876, 781; 370/210, 335, 344, 323, 307, 343, 480, 481, 485, 486, 487, 492; 725/106, 118, 151, 68, 73, 78, 71, 63, 69, 70, 82, 98, 125, 139, 143, 144, 219, 240.07, 260; 375/347, 349, E7.002, E7.021, 132, 134, 97, 235, 226, 229, 232, 260, 261, 262, 263, 264, 265, 298, 316, 340, 344, 345, 346, 348, 350; 334/23; 348/12, 13, 21, 470, 475, 614, 641, 687, 725, 727, 735

See application file for complete search history.

(56) References Cited

U.S. PATENT DOCUMENTS 3,778,716 A * 12/1973 Stokes ........................... 725/73

(Continued)

FOREIGN PATENT DOCUMENTS

WO WO 99/37092 7/1999

(Continued)

*Primary Examiner* — Andrew Wendell
*Assistant Examiner* — Paul P Tran
(74) *Attorney, Agent, or Firm* — Lisa K. Jorgenson; Kevin D. Jablonski; Graybeal Jackson LLP (57) ABSTRACT

A receiver that can receive several initial signals modulated in a same initial frequency band and/or distinct initial frequency bands and generate a signal modulated in a transmission band to be transmitted on a coaxial cable, comprising a selector that can select several signals from among the received signals; for each selected signal, a mixer capable of transforming the selected signal into a signal at least partly in the transmission band, and a filter capable of extracting from the transformed signal a signal associated with a portion of the transmission band from among several at least partly distinct portions of the transmission band; and means for forming the signal modulated in the transmission band from signals associated with the transmission band portions.

26 Claims, 4 Drawing Sheets

U.S. PATENT DOCUMENTS

| | | | | |
|---|---|---|---|---|
| 4,700,191 | A | * | 10/1987 | Manor .............................. 342/13 |
| 4,792,993 | A | * | 12/1988 | Ma ................................. 455/266 |
| 5,276,904 | A | * | 1/1994 | Mutzig et al. .................... 725/68 |
| 5,485,630 | A | * | 1/1996 | Lee et al. ......................... 725/78 |
| 5,487,186 | A | * | 1/1996 | Scarpa ........................ 455/192.2 |
| 5,959,592 | A | * | 9/1999 | Petruzzelli ...................... 725/68 |
| 6,009,130 | A | * | 12/1999 | Lurey et al. ................... 375/347 |
| 6,334,219 | B1 | | 12/2001 | Hill et al. ...................... 725/106 |
| 6,832,071 | B1 | * | 12/2004 | Nakamura et al. ............ 455/3.02 |
| 7,245,892 | B2 | * | 7/2007 | Merio ............................ 455/209 |
| 7,643,634 | B2 | * | 1/2010 | Busson et al. ................. 380/205 |
| 2002/0106009 | A1 | * | 8/2002 | Harrison ....................... 375/219 |

FOREIGN PATENT DOCUMENTS

WO       WO 0251015 A2 * 6/2002

* cited by examiner

| BPF | f(MHz) | W(MHz) | finf(MHz) | fsup(MHz) |
|---|---|---|---|---|
| BPF1 | 1050 | 50 | 862 | 1415 |
| BPF2 | 1450 | 70 | 1075 | 1900 |
| BPFA | 1000 | 50 | 862 | 1207 |
| BPFB | 1238 | 62 | 1025 | 1494 |
| BPFC | 1532 | 76 | 1269 | 1853 |
| BPFD | 1900 | 94 | 1570 | 2400 |
| BPFI | 975 | 44 | 862 | 1110 |
| BPFII | 1136.7 | 51.3 | 997 | 1295 |
| BPFIII | 1325.2 | 59.8 | 1162 | 1510 |
| BPFIV | 1545 | 69.7 | 1355 | 1760 |
| BPFV | 1801 | 81.3 | 1580 | 2053 |
| BPFVI | 2100 | 94.8 | 1842 | 2400 |

FIG. 9

SIGNAL TRANSMISSION ON A COAXIAL CABLE

BACKGROUND OF THE INVENTION

1. Field of the Invention

The present invention relates to a signal processing method and device for transmission of such signals on a coaxial cable.

2. Description of the Related Art

Figure 1:
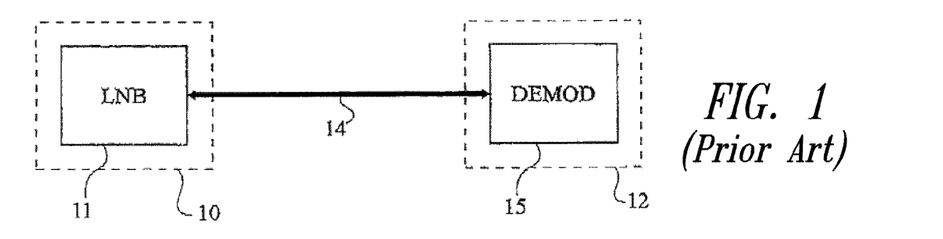
FIG. 1, previously mentioned, schematically shows a conventional device for receiving and processing radio signals.

FIG. 1 schematically shows a device for receiving and processing radio-transmitted modulated analog signals, for example, signals corresponding to video images. This architecture comprises a receive unit 10 which receives, via a receive antenna, a modulated analog signal corresponding to a radio-transmitted electromagnetic wave. Receive unit 10 comprises a low noise block LNB 11 which performs a preprocessing on the received modulated signal. The preprocessed modulated signal is transmitted to a signal-processing unit 12 via a coaxial cable 14. Processing unit 12 comprises a demodulation block DEMOD 15 which extracts a "wanted" modulated signal from the modulated signal transmitted on coaxial cable 14 and demodulates the extracted "wanted" signal. The demodulated "wanted" signal may, for example, be used to display video images on a television screen. In this case, receive unit 10 is located at the level of the receive antenna and processing unit 12, on which the viewer must be able to act, is located at the level of the television set.

Figure 2:
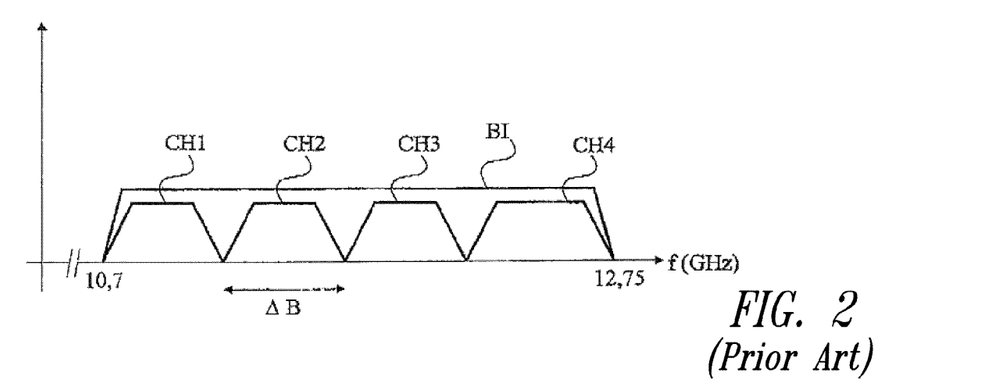
FIG. 2, previously mentioned, illustrates an example of a spectral representation of a radio signal.

FIG. 2 shows a simplified example of the spectrum of a modulated analog or digital signal received by block LNB 11. The signal is comprised of an initial frequency band IBW which extends, for example, between 10.7 GHz and 12.75 GHz, which corresponds to a frequency band generally used for transmission of signals between a satellite and a receive station on ground.

Initial frequency band IBW is divided into frequency channels. The frequency band width ΔB of each channel may vary, for example, from 24 MHz to 36 MHz, four channels CH1 to CH4 being shown as an example in FIG. 2. The initial modulated signal received by the receive unit corresponds to the sum of modulated "wanted" signals. The frequency band of each modulated "wanted" signal is in one of frequency channels CH1 to CH4. Frequency channels CH1 to CH4 associated with "wanted" signals of same biasing are distinct. However, the initial modulated signal may correspond to the sum of signals having different biasings. The biasing may be, for example, rectilinear (horizontal or vertical), or circular (right or left). Since different biasing waves can easily be distinct in a same signal, it is possible to transmit in a same initial signal "wanted" signals of different biasing associated with overlapping frequency channels.

The main functions of block LNB 11 are the following:
- amplifying the received signals with the smallest possible noise factor, typically on the order of one decibel;
- selecting the signal biasing, for example, horizontal or vertical;
- converting the received signals from initial frequency band IBW into a frequency band, called the transmission band, adapted to the passband of coaxial cable 14 and to the frequency band of processing unit 12 (typically, between 950 MHz and 2,150 MHz), and
- limiting the signals to be transmitted to a given frequency band.

Figure 3:
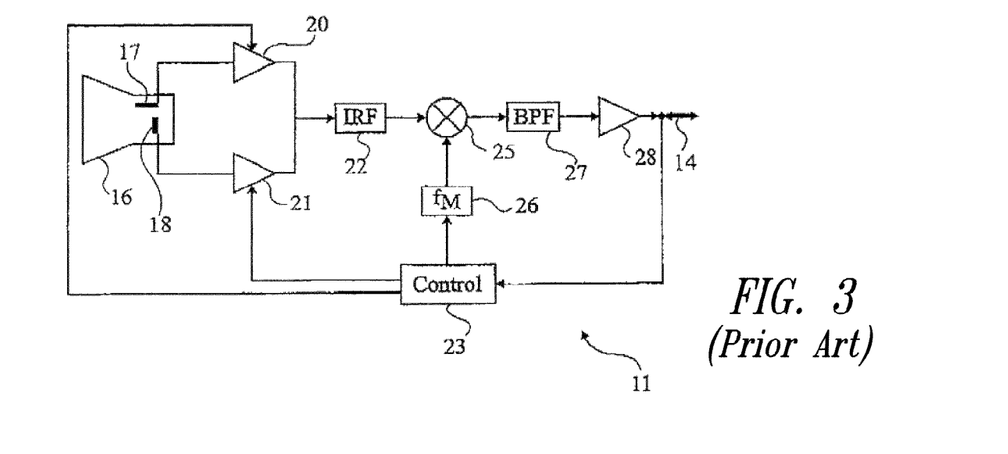
FIG. 3, previously mentioned, shows an example of a conventional architecture of a low noise block.

FIG. 3 schematically shows an example of a conventional architecture of block LNB 11. Block LNB 11 is connected to an antenna 16 receiving the initial radio-transmitted signal. Antenna 16 has two focal points 17, 18. Each focal point 17, 18, captures an initial signal of determined biasing in initial frequency band IBW. For example, focal point 18 may capture a horizontally-biased initial signal and focal point 17 may capture a vertically biased initial signal. Each focal point 17, 18, is connected via an amplifier 20, 21 to a first IRF filter 22 (image rejection filter). Amplifiers 20, 21, may be low-noise field-effect transistors. A control unit 23 drives amplifiers 20, 21 to select one of the two initial signals with a determined biasing.

The initial signal with a determined biasing is then transmitted to a mixer 25 which mixes the initial signal with a mixing frequency $f_M$, transmitted by a frequency synthesizer 26, to displace initial frequency band IBW from the initial signal to the transmission band. IRF filter 22 has the function of avoiding for spurious signals to disturb the signal obtained by the passing through mixer 25. Frequency $f_M$ is a function of initial frequency band IBW and of the transmission band.

The signal thus mixed is transmitted to a band-pass filter BPF 27 which limits the frequency band of the signal to be transmitted to minimize the amount of power on coaxial cable 14. The mixed and filtered signal is finally amplified by an amplifier 28 before being transmitted on coaxial cable 14.

The width of initial frequency band IBW may be larger than the transmission band. In this case, frequency synthesizer 26 may generate several mixing frequencies. Each mixing frequency is adapted so that, in the mixing operation, a specific portion of initial frequency band IBW, of a width similar to the width of the transmission band, is shifted towards the transmission band frequencies. The choice of the mixing frequency is then determined by control unit 23 according to control signals generated by processing unit 12 and transmitted to block LNB 11 by coaxial cable 14.

A processing unit may comprise several demodulation blocks to process in parallel several "wanted" signals of same biasing which are extracted from the signal transmitted by the coaxial cable.

However, it may be desirable for a processing unit to be able to process in parallel several "wanted" signals of different biasing. Similarly, it may be desirable for a processing unit to be able to process in parallel several "wanted" signals coming from an initial signal having a wider initial frequency band than the transmission band, the "wanted" signals originating from different initial frequency band portions. Finally, it may be desirable for a processing unit to be able to process in parallel several "wanted" signals coming from initial signals having distinct initial frequency bands, in particular, in the case of a so-called multiple-orbit antenna which comprises several focal points oriented to receive radio signals of distinct initial frequency bands.

The device of FIG. 1 is then no longer adapted. Indeed, at a same time, the signal transmitted on coaxial cable 14 can only come from a single initial signal and only have a single determined position. Further, when the initial frequency band is wider than the transmission band, the signal transmitted on coaxial cable 14 can only correspond to a single portion of the initial frequency band.

It is then necessary to provide several blocks LNB and to connect each of them to processing unit 12 with a dedicated coaxial cable. Each block LNB then transmits, on the associated coaxial cable, a signal of a given biasing, and which corresponds to a signal of determined initial frequency band (and possibly to a given portion of the frequency band of the initial signal).

The multiplication of coaxial cables has a high cost given that to each coaxial cable correspond at least four connectors, and that processing unit 12 must comprise switches associated with each cable. Further, the cable installation and servicing have a significant cost.

BRIEF SUMMARY OF THE INVENTION

One embodiment of the present invention aims at transmitting on a single coaxial cable, at a same time, "wanted" signals that can have different biasings and/or originate from initial signals of distinct initial frequency bands, and/or, when the initial frequency band is wider than the transmission band, originate from distinct portions of the initial frequency band.

An embodiment of the present invention provides a receiver that can receive several initial signals modulated in a same initial frequency band and/or distinct initial frequency bands and generate a signal modulated in a transmission band to be transmitted on a coaxial cable, the receiver comprising a selector that can select several signals from among the received signal; for each selected signal, a mixer adapted to transforming the selected signal into a signal at least partly in the transmission band, and a filter capable of extracting from the transformed signal a signal associated with a portion of the transmission band from among several at least partly distinct portions of the transmission band; and means for forming the modulated signal in the transmission band from the signals associated with the transmission band portions.

According to an embodiment of the present invention, each mixer is connected to a frequency synthesizer capable of generating a determined mixing frequency, the determined frequency being a function of the portion of the transmission band and of the selected signal.

According to an embodiment of the present invention, the receiver comprises receive focal points, associated with an antenna, each receive focal point being able to receive an initial modulated signal, and intermediary mixers, each intermediary mixer being capable of transforming the initial signal received by a receive focal point into an intermediary signal in an intermediary frequency band different from the transmission band, the selector receiving the intermediary signals.

According to an embodiment of the present invention, the receiver comprises a control unit receiving control signals via the coaxial cable and driving the frequency synthesizers according to the control signals for the generation of the mixing frequency, and the selector for the selection of the received signals.

According to an embodiment of the present invention, the filters are bandpass filters of distinct passbands, and for a first filter, the passband of which is at frequencies greater than those of the passband of a second filter, the difference between the gain of the second filter and the gain of the first filter at the upper limiting frequency of the passband of the second filter is greater than 30 decibels and the difference between the gain of the first filter and the gain of the second filter at the lower limiting frequency of the passband of the first filter is greater than 30 decibels.

According to an embodiment of the present invention, the frequency synthesizer is adapted to provide a determined mixing frequency in a frequency band, the width of which being higher than the width of the initial frequency band or the sum of the widths of the distinct initial frequency bands.

According to an embodiment of the present invention, at least one frequency synthesizer is adapted to transmit directly to the respective filter a periodic signal at a predetermined frequency.

One embodiment of the present invention also provides a method for transforming several modulated signals received in a same initial frequency band and/or distinct initial frequency bands into a signal modulated in a transmission band, comprising selecting several signals from among the received signals; for each selected signal, transforming the selected signal into a signal at least partly in the transmission band, and extracting from the transformed signal a signal associated with a portion of the transmission band from among several portions of the transmission band, at least partly distinct; and forming the modulated signal in the transmission band from the signals associated with the portions of the transmission band.

According to an embodiment of the present invention, before the selection, each received modulated signal is transformed into an intermediary signal in an intermediary frequency band different from the transmission band.

According to an embodiment of the present invention, each selected signal is transformed into a signal at least partly in the transmission band by mixing the selected signal with a mixing frequency depending on the selected signal and on the portion of the transmission band.

According to an embodiment of the present invention, each selected signal may be amplified by a variable gain before being transformed and/or after having been transformed into a signal at least partly in the transmission band, the gain depending on the selected signal.

One embodiment of the present invention also provides a method for testing a receiver that can receive several initial signals modulated in a same initial frequency band or distinct initial frequency bands and that can generate a signal modulated in a transmission band to be transmitted on a coaxial cable, the receiver comprising a selector that can select several signals from among the received signals, for each selected signal, a mixer adapted to transforming the selected signal into a signal at least partly in the transmission band, and a filter capable of extracting from the transformed signal a signal associated with a portion of the transmission band from among several at least partly distinct portions of the transmission band, and means for forming the signal modulated in the transmission band from the signals associated with the transmission band portions, at least one frequency synthesizer being adapted to transmit directly to the respective filter a periodic signal at a predetermined frequency, the receiver being linked, by means of the coaxial cable, to a processing unit adapted to process the signal modulated in the transmission band provided by the receiver in normal operation, the method comprising the transmission from the processing unit to the receiver of a request related to a determined frequency; the transmission from the receiver of a periodic signal corresponding to the receipt by the processing unit if a periodic signal at the determined frequency; the determination by the processing unit of the power of the received periodic signal at the determined frequency; and the determination by the processing unit of the power attenuation of the coaxial cable from the power of the received periodic signal at the determined frequency and the power of the periodic signal transmitted by the receiver.

According to an embodiment of the present invention, the receiver transmits successively through the coaxial cable, upon receipt of requests from the processing unit, periodic signals at different fixed frequencies.

According to an embodiment of the present invention, the receiver provides through the coaxial cable a periodic signal at a first frequency corresponding to the receipt by the processing unit of a periodic signal at the determined frequency, and a periodic signal at a second frequency different from the first frequency, the difference between the first and the second frequencies being representative of the power of the periodic signal at the first frequency transmitted by the receiver.

According to an embodiment of the present invention, each frequency synthesizer of the receiver is adapted to transmit directly to the respective filter a periodic signal, and wherein the receiver transmits to the processing unit, through the coaxial cable, a signal corresponding to the sum of periodic signals provided by the frequency synthesizers, each periodic signal being at frequency equal to the average frequency of one of the portions of the transmission band The foregoing features of the present invention will be discussed in detail in the following non-limiting description of specific embodiments in connection with the accompanying drawings.

DETAILED DESCRIPTION OF THE INVENTION

Embodiments of a signal transmission on a coaxial cable are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 4:
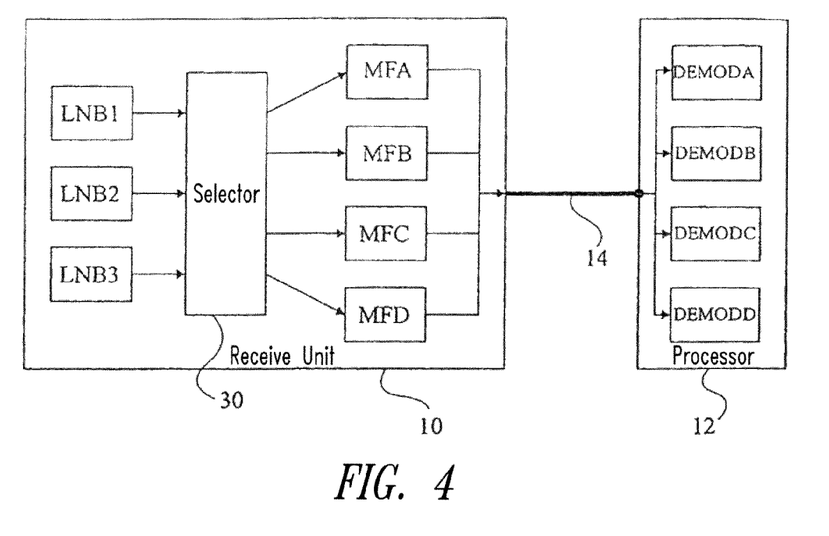
FIG. 4 schematically shows an architecture for receiving and processing radio signals according to an embodiment of the present invention.

As illustrated in FIG. 4, the device comprises a receive unit 10 connected by a coaxial cable 14 to a processing unit 12. As an example, processing unit 12 comprises four demodulation blocks DEMODA to DEMODD, each demodulation block DEMODA to DEMODD comprising, among others, a channel selector and a demodulator.

Receive unit 10 comprises three low noise blocks LNB1, LNB2, LNB3, which have an architecture similar to that of block LNB 11 shown in FIG. 1. More specifically, each low noise block LNB1 to LNB3 is capable of receiving a radio signal in an initial frequency band and outputting a signal of a determined biasing in an intermediary frequency band which is lower than the initial frequency band and greater than the transmission band. As an example, the intermediary frequency band is approximately from 2 to 4 GHz. Each low noise block LNB1 to LNB3 is connected to a selector 30, itself connected to four mixing and filtering blocks MFA to MFD. Selector 30 can transmit any one of the outputs of low noise blocks LNB1 to LNB3 to any one of mixing and filtering blocks MFA to MFD.

Figure 5:
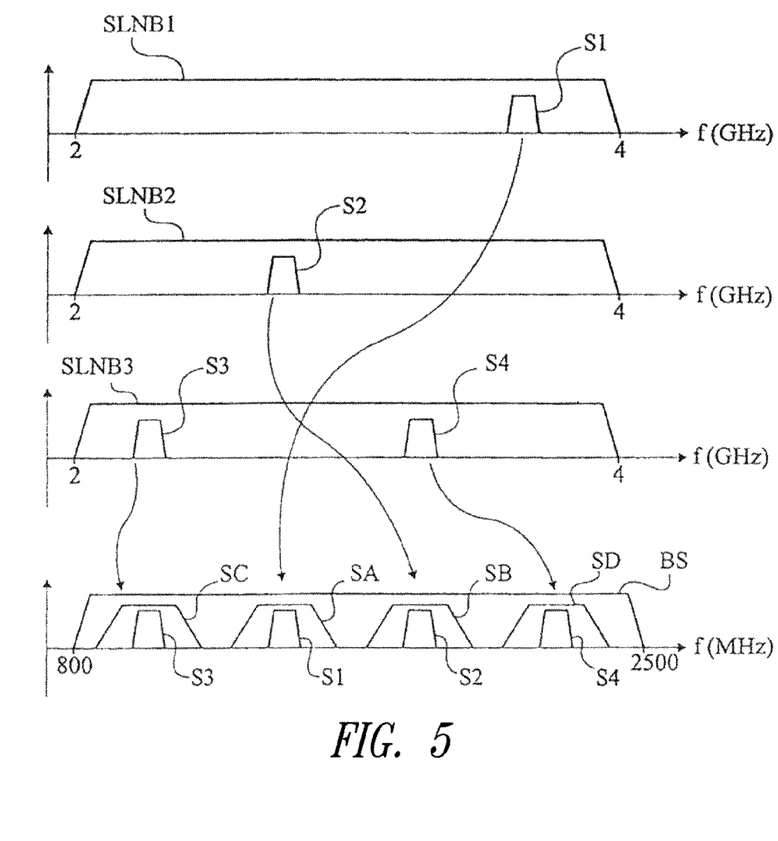
FIG. 5 shows the spectrums of several example signals illustrating the principle of the present invention.

FIG. 5 illustrates by way of example the principle of the present invention. From top to bottom, are schematically shown spectrums SLNB1 to SLNB3 of the signals respectively transmitted by blocks LNB1 to LNB3. For spectrums SLNB1 and SLNB2, the spectrum of a so-called "wanted" signal, respectively S1 and S2, has been shown as an example. For spectrum SLNB3, the spectrums of two "wanted" signals S3 and S4 have been shown. One of the signals transmitted by blocks LNB1 to LNB3 is transmitted by selector 30 to each of blocks MFA to MFD. For example, to blocks MFA and MFB are respectively transmitted the signals generated by block LNB1 and LNB2, and to blocks MFC and MFD is transmitted the signal generated by block LNB3.

Each block MFA to MFD performs a shifting operation on the signal from the intermediary frequency band to a frequency band which completely or partly overlaps the transmission band. The intermediary frequency band is chosen to limit the forming of spurious signals in the shifting operation.

Each block MFA to MFD then filters the shifted signal and keeps a shifted frequency band portion comprised in the transmission band and comprising the spectrum of the wanted signal. The different transmission band portions are respectively referenced as SA to SD for mixing and selection blocks MFA to MFD.

The different signals associated with the transmission band portions SA to SD are added to form a signal with a frequency band BS substantially corresponding to the transmission band. This signal is then transmitted to processing unit 12 by coaxial cable 14. Each demodulator block DEMODA to DEMODD is capable of extracting from and processing in the transmission band signal a signal corresponding to one of the portions of the transmission band.

Figure 6:
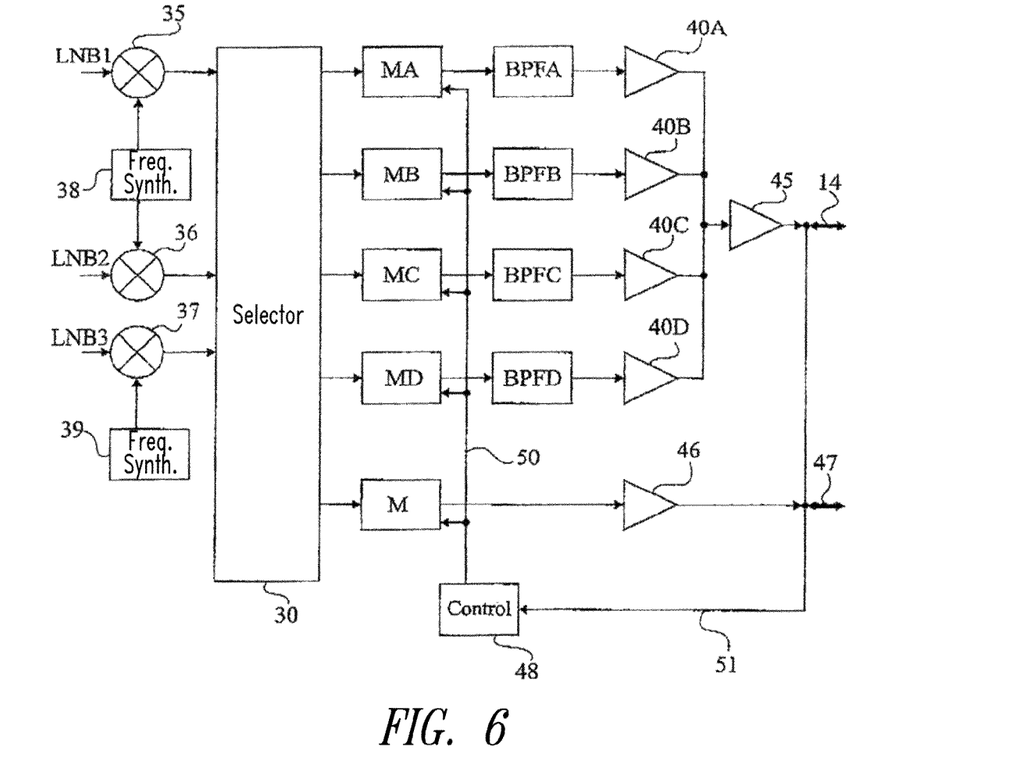
FIG. 6 shows an example embodiment of the receive unit of FIG. 4.

FIG. 6 shows an example of a more detailed architecture of the receive unit 10 of FIG. 4. To the left of the drawing are only shown mixers 35, 36, 37, associated with blocks LNB1 to LNB3. As an example, the mixing frequencies supplying mixers 35, 36 are generated by a single frequency synthesizer 38. The mixing frequency supplying mixer 37 is generated by a frequency synthesizer 39.

Selector 30 receives as an input the signals transmitted by blocks LNB1 to LNB3 and is connected at its output to four blocks MFA to MFD, and to a mixing block M.

Each mixing and selection block MFA to MFD comprises, assembled in series, a mixing block MA to MD, a bandpass filter BPFA to BPFD, and an isolation amplifier 40A to 40D. The signals generated by the four mixing and selection blocks MFA to MFD are added, then amplified by a fixed gain amplifier 45 before being transmitted by coaxial cable 14. The signal originating from mixing block M is amplified by an amplifier 46 and transmitted by an auxiliary coaxial cable 47. A control unit 48 is connected by a first control bus 50 to the different mixing blocks M, MA to MD. The control unit is also connected to coaxial cables 14, 47 by a second control bus 51.

Figure 7:
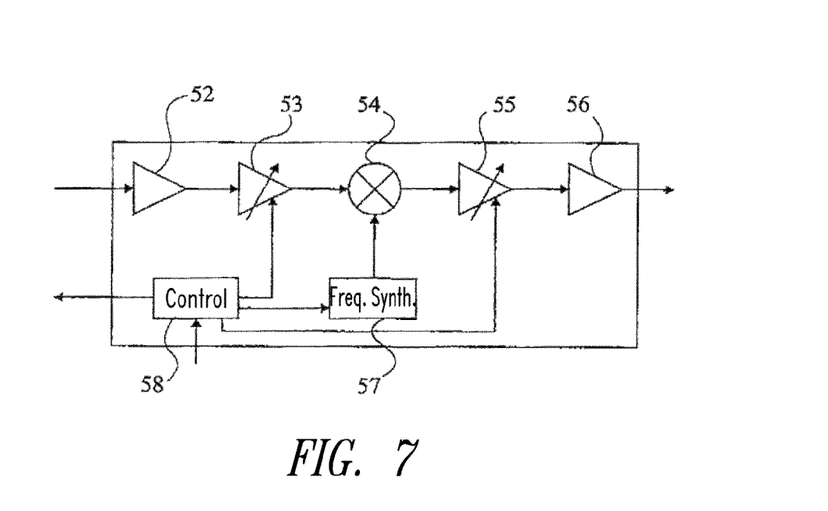
FIG. 7 shows an example embodiment of an element of FIG. 6.

FIG. 7 shows in more detail the architecture of mixing blocks M, MA to MD. Each mixing block comprises, assembled in series, a first fixed gain amplifier 52, a first variable gain amplifier 53, a mixer 54, a second variable gain amplifier 55 and a second fixed gain amplifier 56. Mixer 54 is supplied by a mixing frequency originating from a frequency synthesizer 57. Each mixing block M, MA to MD also comprises a control unit 58 connected to the first control bus 50 and capable of controlling selector 30, frequency synthesizer 57, and variable gain amplifiers 53, 55.

The operation of the device of FIGS. 6 and 7 is the following. According to the "wanted" signals S1 to S4 to be processed by demodulation blocks DEMODA to DEMODD, processing unit 12 transmits control signals to control unit 48, for example, according to the FSK (frequency shift keying) communication protocol or the protocol known as DiSEqC2 (Digital Satellite Equipment Control 2). Control unit 48 accordingly transmits control signals to the control units 58 of one or several mixing blocks M, MA to MD, via first control bus 50, for example according to the communication protocol known as I$^2$C (Integrated Circuit Control).

Control unit 58 having received the control signals then drives selectors 30 so that one of the signals generated by blocks LNB1 to LNB3 is transmitted to the associated mixing block M, MA to MD. Control unit 58 also drives frequency synthesizer 57 of mixing block MA to MD so that it generates a mixing frequency adapted so that the signal received by mixing block MA to MD is properly frequency-shifted so that the frequency band of the "wanted" signal S1 to S4, after crossing mixer 54, is in the passband of bandpass filter BPFA to BPFD associated with mixing block MA to MD. For mixing block M, control unit 58 drives frequency synthesizer 57 of mixing block M so that it generates a mixing frequency adapted so that the signal received by mixing block M is properly frequency-shifted so that the frequency band of the signal transmitted by mixing block M is contained in the passband of auxiliary coaxial cable 47, generally the transmission band.

Variable gain amplifiers 53, 55 enable adjusting the signal amplification upstream or downstream of mixer 54. For example, if the initial signal is of small amplitude, it may be preferable to amplify it upstream of mixer 54. If the amplitude of the initial signal is sufficient, but the coaxial cable is very long, it may be preferable to amplify the signal downstream of mixer 54 to avoid clipping phenomena in the shifting operation. Each mixing block M, MA to MD may comprise of an integrated circuit.

Auxiliary coaxial cable 47 is provided to enable use of the receive unit according to an embodiment of the present invention with a conventional unit that can only process the signal transmitted on coaxial cable 14. Indeed, the signal transmitted on coaxial cable 47 is similar to the signal originating from block LNB of FIG. 3.

Figure 8:
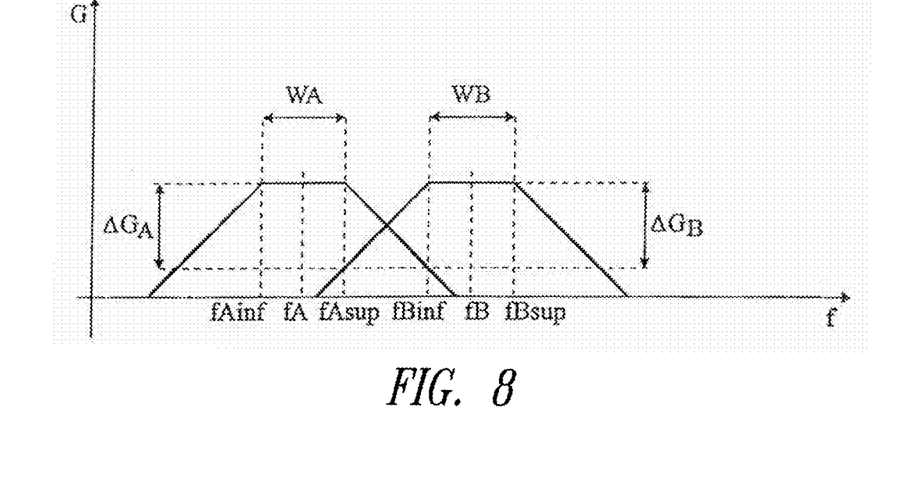
FIG. 8 shows the shape of the attenuation contour of a bandpass filter used in one embodiment of the present invention.

FIG. 8 shows an example of the attenuation contours of two bandpass filters, for example, BPFA and BPFB, the passbands of which are close. Each filter comprises a passband, of width WA, WB, centered on an average frequency $f_A$, $f_B$, and limited by an upper frequency $f_{ASUP}$, $f_{BSUP}$ and a lower frequency $f_{AINF}$, $f_{BINF}$. The attenuation contours are determined so that the gain of filter BPFB at frequency $f_{ASUP}$ exhibits a difference ΔGA of at least 30 dB with the gain of filter BPFA, and that the gain of filter BPFA at frequency $f_{BINF}$ exhibits a difference ΔGB of approximately 30 dB with the gain of filter BPFB.

Figure 9:
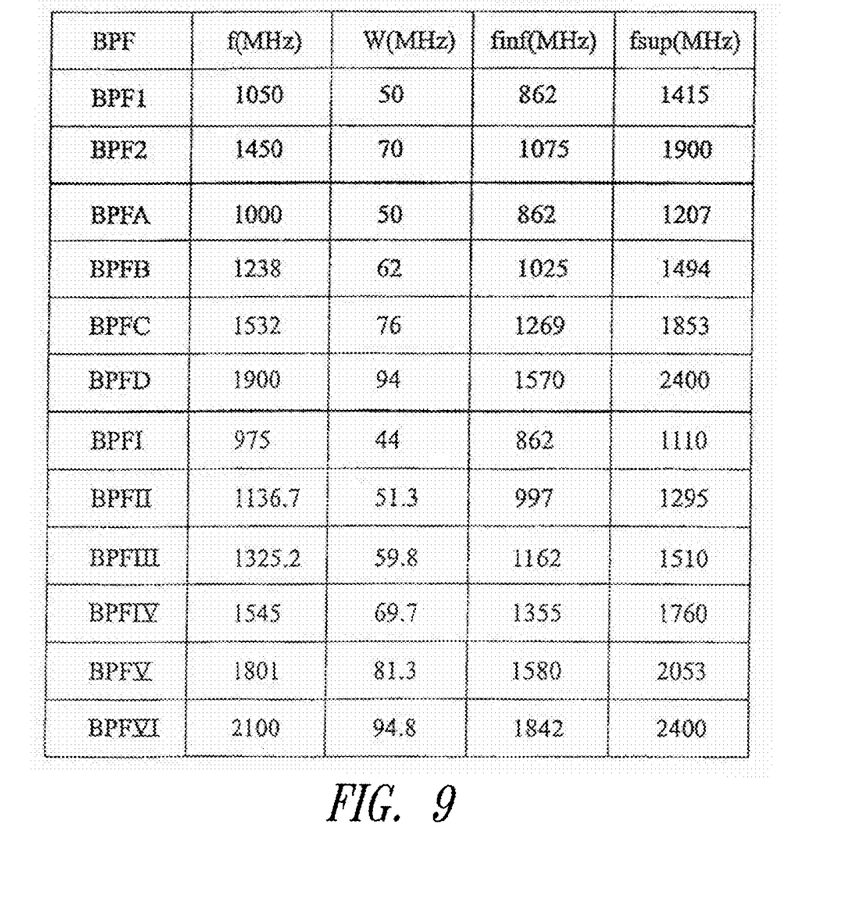
FIG. 9 shows examples of values of the attenuation contour of the bandpass filter of FIG. 8.

FIG. 9 shows as an example numerical values of the characteristics of the attenuation contours of the band pass filters of mixing and selection blocks in three different configurations. The first configuration comprises two mixing and selection blocks (bandpass filters BPF1 and BPF2), the second configuration comprises four mixing and selection blocks (bandpass filters BPFA to BPFD), which corresponds for example to the architecture of FIG. 4, and the third configuration comprises six mixing and selection blocks (bandpass filters BPFI and BPFVI). The second column represents the average frequency f of the passband of each bandpass filter. The third column represents width W of the passband of each bandpass filter. The fourth column shows lower frequency $f_{INF}$ of the passband of each bandpass filter and the fifth column represents upper frequency $f_{SUP}$ of the passband of each band pass filter.

As appears in FIG. 8, the passbands of the bandpass filters in all configurations are larger than the usual channel passbands (approximately from 24 to 36 MHz). The bandpass filters may be formed in a discrete manner.

An embodiment of the present invention has many advantages.

It enables transmission on a same coaxial cable of "wanted" signals that may have different biasings. Indeed, the signals coming from low noise blocks LNB1 to LNB3, and which will be processed by mixing and filtering blocks MFA to MFD, may have different biasings.

Further, it enables transmission on a same coaxial cable of "wanted" signals that may come from signals of distinct initial frequency bands. Indeed, two signals transmitted by two blocks LNB1 to LNB3 may have distinct initial frequency bands.

Moreover, it enables transmission on a same coaxial cable of "wanted" signals that can, when the initial frequency band is wider than the transmission band, originate from distinct portions of the initial frequency band. Indeed, two signals transmitted by two blocks LNB1 to LNB3 may correspond to distinct portions of the initial frequency band of a same signal.

An embodiment of the present invention enables forming in a compact manner a receive unit of reduced volume.

An embodiment of the present invention finally enables forming the bandpass filters with relatively inexpensive discrete components.

According to another embodiment of the invention, the frequency synthesizer of each mixing block, which shifts the radio signal from the intermediary frequency band to a final frequency band, produces a mixing frequency, called second mixing frequency, which can vary in a frequency band wider than the initial band. The range of the second mixing frequency is such that only one frequency synthesizer can be used for the conversion of the radio signal from the initial frequency band to the intermediary frequency band. This synthesizer generates the same fixed mixing frequency, called first mixing frequency, for all the signals issued from the low noise blocks. The conversions of the radio signal from the initial frequency band to the intermediary frequency band and from the intermediary band to the final frequency band can be two infra heterodyne conversions or two super heterodyne conversions. The bandpass filter associated to a mixing block has a bandwidth adapted to select, in the radio signal issued from the mixing block, the "wanted" signal. Selected "wanted" signals are then added to form the signal transmitted on the coaxial cable as previously described.

For example, if the initial frequency band is between 10.7 GHz and 12.75 GHz, the first mixing frequency can be 13.25 GHz and the second mixing frequency can be chosen between 1.9 GHz and 4.3 GHz. In this example, the conversions of the radio signal from the initial frequency band to the intermediary frequency band and from the intermediary frequency band to the final frequency band are super heterodyne conversions. The spectrum of the radio signal is then inverted twice.

The width of the bandpass filter associated with a mixing block can be selected so that the minimal frequency of the bandpass filter corresponds to the highest frequency of the final frequency band when the second mixing frequency is set at the lowest value. In the present example, the minimal frequency of the bandpass filter is 1.4 GHz with the second mixing frequency being set at 1.9 GHz. The maximal frequency of the bandpass filter corresponds to the lowest frequency of the final frequency band when the second mixing frequency is set at the highest value. In the present example, the maximal frequency of the bandpass filter is 1.75 GHz with the second mixing frequency being set at 4.3 GHz. With a coaxial cable having a bandpass between 950 MHz and 2150 MHz, three mixing blocks and the corresponding filters can be provided in the present example.

This embodiment of the invention provides further advantages.

Provided the frequency band of the second mixing frequency is wide enough, this embodiment enables the use of only one first mixing frequency for the conversion of the radio signal from the initial frequency band to the intermediary frequency band. Only one frequency synthesizer is then used to generate the first mixing frequency. The number of low noise blocks can then be reduced to the number of possible biasings of the radio signal. Thus a smaller and lighter housing for the receive unit is provided, and the shielding mechanisms which protect the lines conveying high frequency signals, and the selector are simplified.

This embodiment can be easily made compatible with a common receive unit which transmits on the coaxial cable only one signal which occupies the totality of the transmission band. A further wide bandpass filter, for example having a bandpass equal to the transmission band, is provided in parallel to a "normal" bandpass filter linked to a mixing block. In regular operation, the further wide bandpass filter is switched off. When the receive unit must be operated as a common receive unit, the further wide bandpass filter is switched on and all the mixing blocks are turned off, except the mixing block linked to the further wide bandpass filter. The "normal" bandpass filter linked to the active mixing block is also switched off. The second mixing frequency of the activated mixing block is chosen so that the conversions of the radio signal from the initial frequency band to the intermediary band and from the intermediary band to the final frequency band are equivalent to a single conversion with an equivalent mixing frequency equal to 9.75 GHz or 10.6 GHz, in the present example, depending on the desired band of the radio signal to transmit on the coaxial cable. In the previous example, to obtain an equivalent mixing frequency equal to 9.75 GHz, the second mixing frequency is fixed at 3500 MHz. To obtain an equivalent mixing frequency equal to 10.6 GHz, the second mixing frequency is fixed at 2650 MHz.

This embodiment is thus compatible with a common signal-processing unit without adding another coaxial cable and without modifying the selector.

According to another embodiment of the invention, not shown, a special operation of the receive unit 10 is provided, called hereafter test mode. In such a test mode, the frequency synthesizer 57 of one of the mixing blocks MA to MD is adapted to provide a mixing frequency signal directly to the bandpass filter BPFA to BPFD linked to the mixing block, through a frequency divider, instead of providing the mixing frequency signal to the mixer 54 of the mixing block in normal operation, as previously described. This frequency synthesizer is called hereafter test synthesizer when operating in the test mode.

The frequency of the signal generated by the frequency synthesizer 57 is divided in the test mode so that the bandpass filter BPFA to BPFD receives a signal with a fixed frequency in the transmission band.

The test mode includes, for example, determining the losses of the coaxial cable 14. It then comprises, for example, the following steps:

the processing unit 12 transmits to the control unit 48 of the receive unit 10 a request to turn off all the mixing blocks MA to MD, for example by turning off the power supply thereof. The request can be transmitted according to the protocol known as DiSEqC1. DiSEqC1 protocol is a monodirectional data exchange protocol used to transmit data from the processing unit 12 to the receive unit 10. DiSEqC1 protocol is easier to use than the protocol known as DiSEqC2 which is adapted to a bidirectional data exchange between the processing unit 12 and the receive unit 10;

one of the demodulation blocks DEMODA to DEMODD of the processing unit 12, or the only demodulation block of the processing unit 12, is driven in order to extract a signal with a determined fixed frequency, called test frequency, by example 1700 MHz. The power of the received signal at the test frequency is checked to be low;

the processing unit 12 transmits to the control unit 48 a new request so that the test synthesizer provides to the bandpass filter a fixed frequency signal. The frequency of the signal supplied to the bandpass filter is slightly greater than the test frequency, for example by 2 MHz, to take into account a systematic frequency shifting at the demodulation block;

the demodulation block of the receive unit 12 extracts again the signal at the test frequency. The power of the received signal at the test frequency, or received power $P_R$, is then determined;

the attenuation of the cable corresponds to the difference between the power transmitted at the output of the receive unit 10 (i.e. at the connection between the receive unit 10 and the coaxial cable 14), called transmitted power $P_T$, and the received power $P_R$, both powers being expressed in decibels;

the processing unit 12 transmits to the control unit 48 a new request to turn off the test synthesizer. The test mode is then finished.

The transmitted power $P_T$ is, for example, calculated according to one of the following ways:

the value of the transmitted power $P_T$ corresponds to a preset value. Although this way is easy to implement, the accuracy of the attenuation is then rather low;

values of the transmitted power $P_T$ at several frequencies are stored at the receive unit 10 and these valeurs are transmitted by the receive unit to the processing unit during the test mode, for example using the data exchange protocol known as DiSEq2;

the value of the transmitted power $P_T$ is transmitted from the receive unit 10 to the processing unit 12 by means of the test synthesizer as described hereafter.

This embodiment is adapted to a simple determination of coaxial cable characteristics.

Moreover, the test mode of the attenuation is, for example, done for several frequencies regularly spaced, by example with a step of 50 MHz. A processing is then realized on the received power values to obtain a function illustrating the variation of the received power $P_R$ with the frequency. When the received power $P_R$ is low, either there is a low quality connection in the device or the receive unit does not work normally. When the function illustrating the variation of the received power $P_R$ with the frequency shows riddles, a possibility is that there is an impedance mismatch, a connector is not well screwed, etc. When the received power $P_R$ decreases strongly with the frequency, a possibility is a low quality coaxial cable.

According to this embodiment, the receive unit 10 is adapted to transmit useful data to the processing unit 12 even if a bidirectional data exchange protocol is not provided between the receive unit and the processing unit, for example the protocol known as DiSEq2.

According to a first example, the transmitted data correspond to the average frequencies of the frequency sub-bands provided by the bandpass filters BPFA to BPFD. In this example, each synthesizer of a mixing block MDA to MDD is adapted to supply a fixed frequency signal directly to the bandpass filter BPFA to BPFD linked to the mixing block. Upon receiving a request transmitted by the processing unit, the control unit 58 drives the frequency synthesizers so that each frequency synthesizer provides to the respective bandpass filter a signal, the frequency of which corresponds to the average frequency of the band-pass of the respective bandpass filter. The different fixed frequency signals are then added and the so formed signal is transmitted on the coaxial cable. The values of the average frequencies are, for example, stored at the control unit. The processing unit then scans the received signal on the whole transmission band to find the average frequencies.

According to a second example, the transmitted data corresponds to the power $P_T$ transmitted by the receive unit 10. Only one test synthesizer is then required. Values of the transmitted power $P_T$ at different frequencies are stored at the receive unit 10. The processing unit 12 sends to the receive unit 10 a request which contains a determined frequency at which the processing unit needs to know the power transmitted by the receive unit 10. Then, the control unit 48 drives the test synthesizer so that it provides directly to the respective bandpass filter a first signal, the frequency of which, after division, is equal to the determined frequency. When the processing unit 12 finds the signal at the determined frequency transmitted by the receive unit on the coaxial cable, it sends to the receive unit a request to process on. The control unit 48 then drives the test synthesizer so that it provides directly to the respective bandpass filter a second signal, the frequency of which, after division, is shifted from the determined frequency. The shift between the determined frequency of the first signal and the frequency of the second signal is proportional to the transmitted power $P_T$ at the determined frequency.

Of course, the present invention is likely to have various alterations, modifications, and improvements which will readily occur to those skilled in the art. In particular, control unit 48 may be suppressed, control units 58 of mixing blocks M, MA to MD being directly connected to the second control bus and directly receiving the signals transmitted by processing unit 12.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

What is claimed is:

1. A receiver, the receiver comprising:
a selector for selecting plural signals from among a plurality of received signals connected to a plurality of low noise blocks; wherein the selector is connected in parallel to a plurality of mixers and to a plurality of filters;
the plurality of mixers configured to transform respectively the selected signals into respective transformed signals at least partly in a transmission band of an output signal to be transmitted on a coaxial cable;
the plurality of filters configured to extract respectively from the transformed signals a plurality of filtered signals having a smaller bandwidth than that of an initial frequency band corresponding to the selected signals and associated respectively with at least partly distinct portions of the transmission band; wherein the mixers and filters perform a shifting operation on the selected signals from an intermediate frequency band to a frequency band which completely overlaps the transmission band and wherein the intermediary frequency band is chosen to limit the forming of spurious signals in the shifting operation;
means for forming the output signal modulated in the transmission band from the filtered signals respectively associated with the transmission band portions, by adding together, prior to transmission on the coaxial cable, the filtered signals so as to obtain the output signal modulated in the transmission band.

2. The receiver of claim 1, wherein each mixer is connected to a frequency synthesizer capable of generating a determined mixing frequency, the determined frequency being a function of the portion of the transmission band and of the selected signal.

3. The receiver of claim 1, further comprising receive focal points, associated with an antenna, each receive focal point being able to receive an initial modulated signal, and intermediary mixers, each intermediary mixer being capable of transforming the initial signal received by a receive focal point into an intermediary signal in an intermediary frequency band different from the transmission band, the selector receiving the intermediary signals.

4. The receiver of claim 2, further comprising a control unit receiving control signals via the coaxial cable and driving the frequency synthesizers according to the control signals for the generation of the mixing frequency, and the selector for the selection of the received signals.

5. The receiver of claim 2, wherein the frequency synthesizer is adapted to provide a determined mixing frequency in a frequency band, the width of which being higher than the width of the initial frequency band or the sum of the widths of the distinct initial frequency bands.

6. The receiver of claim 2, wherein at least one frequency synthesizer is adapted to transmit directly to the respective filter a periodic signal at a predetermined frequency.

7. A receiver, the receiver comprising:
a selector that can select plural signals from among a plurality of received signals;
plurality of mixers configured to transform respectively the selected signals into respective transformed signals at least partly in a transmission band of an output signal to be transmitted on a coaxial cable;
plurality of filters configured to extract respectively from the transformed signals a plurality of filtered signals having a smaller bandwidth than that of an initial frequency band corresponding to the selected signals and associated respectively with at least partly distinct portions of the transmission band; and means for forming the output signal modulated in the transmission band from the filtered signals respectively associated with the transmission band portions, by adding together, prior to transmission on the coaxial cable, the filtered signals so as to obtain the output signal modulated in the transmission band;

wherein the filters are bandpass filters of distinct passbands, and wherein for a first filter, the passband of which is at frequencies greater than those of the passband of a second filter, a difference between a gain of the second filter and a gain of the first filter at an upper limiting frequency of the passband of the second filter is greater than 30 decibels and a difference between a gain of the first filter and a gain of the second filter at a lower limiting frequency of the passband of the first filter is greater than 30 decibels.

8. A method, comprising:

transforming plural modulated signals received by a receiver in a same initial frequency band or distinct initial frequency bands by a plurality of low noise blocks coupled to a plurality of first mixers into an output signal modulated in a transmission band by a selector coupled to a plurality of second mixers and second filters, the transforming including:

selecting by a selector plural signals from among a plurality of received signals output from a plurality of low noise blocks each connected to one of the first mixers;

transforming by one of the second mixers the selected signals respectively into plural transformed signals at least partly in the transmission band;

extracting respectively, from the transformed signals, by one of the second filters the extracted signals associated respectively with respective portions of the transmission band, the respective portions being at least partly distinct and having a smaller bandwidth than that of an initial frequency band corresponding to the selected signals;

wherein each of the plurality of the second mixers and second filters perform a shifting operation on the selected signals from an intermediate frequency band to a frequency band which completely overlaps the transmission band and wherein the intermediary frequency band is chosen to limit the forming of spurious signals in the shifting operation; and forming the output signal modulated in the transmission band from the extracted signals associated respectively with the portions of the transmission band by adding together the extracted signals.

9. The method of claim 8, wherein before the selecting, each received modulated signal is transformed into an intermediary signal in an intermediary frequency band different from the transmission band.

10. The method of claim 8, wherein each selected signal is transformed into a signal at least partly in the transmission band by mixing the selected signal with a mixing frequency depending on the selected signal and on the portion of the transmission band.

11. The method of claim 8, wherein each selected signal is amplified at a variable gain before being transformed or after having been transformed into a signal at least partly in the transmission band, the gain depending on the selected signal.

12. A testing method for a receiver that can receive several initial signals modulated in a same initial frequency band or distinct initial frequency bands and that can generate a signal modulated in a transmission band to be transmitted on a coaxial cable, the receiver comprising a selector that can select several signals from among the received signals, for each selected signal, a mixer adapted to transforming the selected signal into a signal at least partly in the transmission band, and a filter capable of extracting from the transformed signal a signal associated with a portion of the transmission band from among several at least partly distinct portions of the transmission band, and means for forming the signal modulated in the transmission band from the signals associated with the transmission band portions, at least one frequency synthesizer being adapted to transmit directly to the respective filter a periodic signal at a predetermined frequency, the receiver being linked, by means of the coaxial cable, to a processing unit adapted to process the signal modulated in the transmission band provided by the receiver in normal operation, the method comprising;

transmission from the processing unit to the receiver of a request related to a determined frequency;

transmission from the receiver of a periodic signal corresponding to the receipt by the processing unit of a periodic signal at the determined frequency;

determination by the processing unit of the power of the received periodic signal at the determined frequency; and determination by the processing unit of the power attenuation of the coaxial cable from the power of the received periodic signal at the determined frequency and the power of the periodic signal transmitted by the receiver.

13. The method according to claim 12, wherein the receiver transmits successively through the coaxial cable, upon receipt of requests from the processing unit, periodic signals at different fixed frequencies.

14. The method according to claim 12, wherein the receiver provides through the coaxial cable a periodic signal at a first frequency corresponding to the receipt by the processing unit of a periodic signal at the determined frequency, and a periodic signal at a second frequency different from the first frequency, the difference between the first and the second frequencies being representative of the power of the periodic signal at the first frequency transmitted by the receiver.

15. The method according to claim 12, wherein each frequency synthesizer of the receiver is adapted to transmit directly tot eh respective filter a periodic signal, and wherein the receiver transmits to the processing unit, through the coaxial cable, a signal corresponding to the sum of periodic signals provided by the frequency synthesizers, each periodic signal being at frequency equal to the average frequency of one of the portions of the transmission band.

16. An apparatus, comprising:

a plurality of low noise blocks to receive a corresponding plurality of first signals that are modulated in at least one initial frequency band;

a plurality of first mixers respectively coupled to the plurality of low noise blocks to cooperate with the low noise blocks to generate, from the plurality of first signals, a corresponding plurality of second signals that are at intermediate frequency bands;

a selector coupled in parallel to a plurality of first mixers which receive the plurality of second signals, from which the selected signal is selected by the selector;

a plurality of second mixers, each coupled to the selector to transform the selected signal into a third signal at least partly in a transmission frequency band; and a plurality of second filters each coupled to each one of the second mixers to obtain, from the transformed signal, a fourth signal that is associated with a portion of the transmission frequency band from among portions of the transmission frequency band; and circuitry coupled to the filters to combine the fourth signals into a fifth signal that is at substantially the transmission frequency band;

wherein each of the plurality of the second mixers and second filters perform a shifting operation on the selected signals from an intermediate frequency band to a frequency band which completely overlaps the transmission band and wherein the intermediary frequency band is chosen to limit the forming of spurious signals in the shifting operation.

17. The apparatus of claim 16 wherein the intermediate frequency band is lower that the initial frequency band and is greater that the transmission frequency band.

18. The apparatus of claim 16, further comprising a frequency synthesizer respectively coupled to each mixer to generate a mixing frequency that is based on the portion of the transmission frequency band and of the selected signal.

19. The apparatus of claim 18, further comprising a control circuit coupled to the frequency synthesizers to control generation of their mixing frequency.

20. The apparatus of claim 16 wherein the filters comprise passband filters.

21. The apparatus of claim 16, further comprising an auxiliary mixing block coupled to the selector to provide another signal at the transmission frequency band.

22. A method, comprising:

transforming plural modulated signals received by a receiver in a same initial frequency band or distinct initial frequency bands by a plurality of low noise blocks coupled to a plurality of first mixers into an output signal modulated in a transmission band by a selector coupled to a plurality of second mixers and second filters, the transforming including:

selecting by a selector plural signals from among a plurality of received signals output from a plurality of low noise blocks each connected to one of the first mixers;

transforming respectively by one of the second mixers the selected signals into transformed signals at least partly in a transmission frequency band;

extracting respectively, from the transformed signals, by one of the second filters the respective extracted signals having a smaller bandwidth than that of an initial frequency band corresponding to the extracted signals and associated respectively with respective distinct portions of the transmission frequency band;

wherein each of the plurality of the second mixers and second filters perform a shifting operation on the selected signals from an intermediate frequency band to a frequency band which completely overlaps the transmission band and wherein the intermediary frequency band is chosen to limit the forming of spurious signals in the shifting operation; and forming a modulated signal in the transmission frequency band from the extracted signals associated respectively with the respective portions of the transmission frequency band by adding together the extracted signals.

23. The method of claim 22, further comprising prior to selecting the several signals, transforming the received signals, having at least one initial frequency band, into intermediary signals in an intermediate frequency band different from the transmission frequency band.

24. The method of claim 22 wherein transforming the selected signal into the signal at least partly in the transmission frequency band includes mixing the selected signal with a mixing frequency, based on the selected signal and on the portion of the transmission frequency band.

25. The method of claim 22, further comprising amplifying each selected signal at a variable gain prior to transformation, the gain being based on the selected signal.

26. The method of claim 22, further comprising amplifying each selected signal at a variable gain after transformation, the gain being based on the selected signal.

* * * * *

UNITED STATES PATENT AND TRADEMARK OFFICE
CERTIFICATE OF CORRECTION

PATENT NO.        : 7,953,366 B2
APPLICATION NO.   : 10/354359
DATED             : May 31, 2011
INVENTOR(S)       : Jean-Yves Couet It is certified that error appears in the above-identified patent and that said Letters Patent is hereby corrected as shown below:

- In Claim 15, Column 14, Line 42 of the patent, "directly tot eh respective" should read --directly to the respective--.

- In Claim 17, Column 15, Line 12 of the patent, "band is lower that the initial" should read --band is lower than the initial--.

- In Claim 17, Column 15, Line 13 of the patent, "greater that the transmission frequency" should read --greater than the transmission frequency--.

Signed and Sealed this
Thirtieth Day of August, 2011

David J. Kappos
*Director of the United States Patent and Trademark Office*